United States Patent
Lin et al.

(10) Patent No.: US 8,674,667 B2
(45) Date of Patent: Mar. 18, 2014

(54) POST REGULATION CONTROL CIRCUIT

(75) Inventors: Kuo-Fan Lin, Taoyuan Hsien (TW); Hua-Ming Lu, Taipei (TW)

(73) Assignee: FSP Technology Inc., Taoyuan, Taoyuan Hsien (TW)

( * ) Notice: Subject to any disclaimer, the term of this patent is extended or adjusted under 35 U.S.C. 154(b) by 571 days.

(21) Appl. No.: 12/648,831

(22) Filed: Dec. 29, 2009

(65) Prior Publication Data

US 2011/0156481 A1  Jun. 30, 2011

(51) Int. Cl.
*H02M 1/00* (2007.01)

(52) U.S. Cl.
USPC ............................................ 323/266; 323/272

(58) Field of Classification Search
USPC ................................................. 323/266–272
See application file for complete search history.

(56) References Cited

U.S. PATENT DOCUMENTS

| | | | |
|---|---|---|---|
| 5,396,412 A * | 3/1995 | Barlage | 323/266 |
| 5,771,162 A * | 6/1998 | Kwon | 363/21.18 |
| 2005/0225176 A1* | 10/2005 | Gan et al. | 307/31 |
| 2008/0304195 A1* | 12/2008 | Lin | 361/89 |
| 2009/0206671 A1* | 8/2009 | Chang | 307/65 |

FOREIGN PATENT DOCUMENTS

| | | |
|---|---|---|
| TW | 475281 | 2/2002 |
| TW | I317856 | 12/2009 |

\* cited by examiner

*Primary Examiner* — Jue Zhang
(74) *Attorney, Agent, or Firm* — Winston Hsu; Scott Margo

(57) ABSTRACT

A post regulation control circuit aims to monitor ancillary output power generated from a power supply. The power supply includes at least one primary output circuit to provide a primary output power. A post regulation circuit obtains the primary output power and regulate to an ancillary output power. The monitor circuit sets an abnormal level and obtains a detection power from the post regulation circuit to compare with the abnormal level. Determining whether to output a driving pulse wave according to the detection power is over the abnormal level or not, or stop outputting the driving pulse wave.

8 Claims, 5 Drawing Sheets

POST REGULATION CONTROL CIRCUIT

FIELD OF THE INVENTION

The present invention relates to a post regulation control circuit and particularly to a post regulation control circuit to provide control and protection for a power supply.

BACKGROUND OF THE INVENTION

A power supply to provide multiple outputs of different potentials is a technique known in the art. The commonly seen power supply usually has a transformer with a secondary side divided into at least one primary output circuit and a post regulation circuit connecting to the primary output circuit. The primary output circuit aims to provide primary output power which forms a greater proportion of output power through winding induction on the secondary side of the transformer. The post regulation circuit provides ancillary output power with a lower voltage and lower power by lowering the voltage of the primary output power. Take the power supply of a general desktop computer as an example, the primary output power with power and current at a greater proportion of the total output is 12V and 5V, and is delivered through two windings. The post regulation circuit is then employed to generate 3.3V.

Based on the aforesaid conventional technique, refer to FIG. 1 for a conventional post regulation circuit in which a power supply contains a transformer. The transformer has a primary side 10 with a passing current controlled by a pulse width modulation (PWM) controller outputting a PWM signal and one set of switches. The transformer has a secondary side with multiple primary output circuits 11 and 12 to generate induction power through different windings. A duty cycle signal (Duty_s) and a synchronous rectified signal (FW_O) drive a plurality of switches (Q1, Q2, Q3 and Q4) to perform synchronous rectification, and through inductors (L1 and L2) and capacitors to steady power waveforms to form two primary output power ($I_{L1}$ and $I_{L2}$) (12V and 5V). In addition, one set of post regulation circuit 13 comprising one set of switches 131 and 132, an inductor 133 ($L_{POST}$) and capacitors and resistors connects to the primary output circuit 12. Through the switches 131 and 132, the voltage is regulated to form an ancillary output power ($I_{Lpost}$) of 3.3V. The switches 131 and 132 are controlled by a post control circuit (not shown in the drawings) which outputs one set of control signals (HS and LS). By integrating current flowing through the inductor 133 to get a voltage, a driving signal can be formed through amplification of an amplifier to control the ON period of the switches 131 and 132.

Control of the present post regulation circuit relies on monitoring its induction current and performing integration of the induction current to get a corresponding voltage to regulate the ON period of the switches. Protection of the post regulation circuit is accomplished by setting an upper current limit. In the event that the induction current reaches the upper current limit, the rear edge of the driving pulse wave of the PWM controller is forcefully shrunk to prevent over current. However, when a short circuit occurs at the ancillary output power, current increases rapidly even if the rear edge of the driving pulse wave has been shrunk, the induction current of the post regulation circuit could rise instantly (about within 2-3 clocks) to generate over current 91 as shown in FIG. 2. Due to the amount of the over current 91 is excessively large, a reverse current 92 is generated on the primary output circuit connected to the post regulation circuit, and rectification elements could be burned out. This not only disables the post regulation circuit, the primary output circuit connected to the post regulation circuit also is damaged.

SUMMARY OF THE INVENTION

In view of the aforesaid conventional technique in which the post regulation circuit is damaged when a short circuit occurs and the primary output circuit also is wrecked by the generated reverse current, the primary object of the present invention is to provide a control and protection circuit to control operation of a post regulation circuit and also suppress over current of the post regulation circuit so that the primary output circuit is not impacted by the short circuit of the post regulation circuit and can function continuously.

The present invention provides a post regulation control circuit to control ancillary output power generated by a power supply. The power supply includes a transformer which has a secondary side connected to at least one primary output circuit. The present invention includes a post regulation circuit connected to the primary output circuit and receives a primary output power from the primary output circuit. The post regulation circuit comprises a set of switch unit to regulate the primary output power to an ancillary output power and a monitor circuit to control duty time series of the switch unit. The monitor circuit comprises a pulse wave generation unit, a power monitor unit and a logic unit. The pulse wave generation unit outputs a first pulse wave to the logic unit. The power monitor unit sets an abnormal level and obtains a detection power from the post regulation circuit to compare with the abnormal level, and can output a status signal to indicate whether the detection power is over the abnormal level. The status signal is sent to the logic unit. Finally, the logic unit, according to the status signal, determines whether to output a driving pulse wave based on the waveform of the first pulse wave, or stop outputting the driving pulse wave to limit the duty time series of the switch unit. Therefore, before the induction current of the post regulation circuit generates a reverse current on the primary output circuit, operation of the switch unit is limited. Hence even if the post regulation circuit encounters short circuit or damage, the primary output circuit does not generate reverse current, thus the post regulation circuit provides the benefit of an independent protection mechanism.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 3:
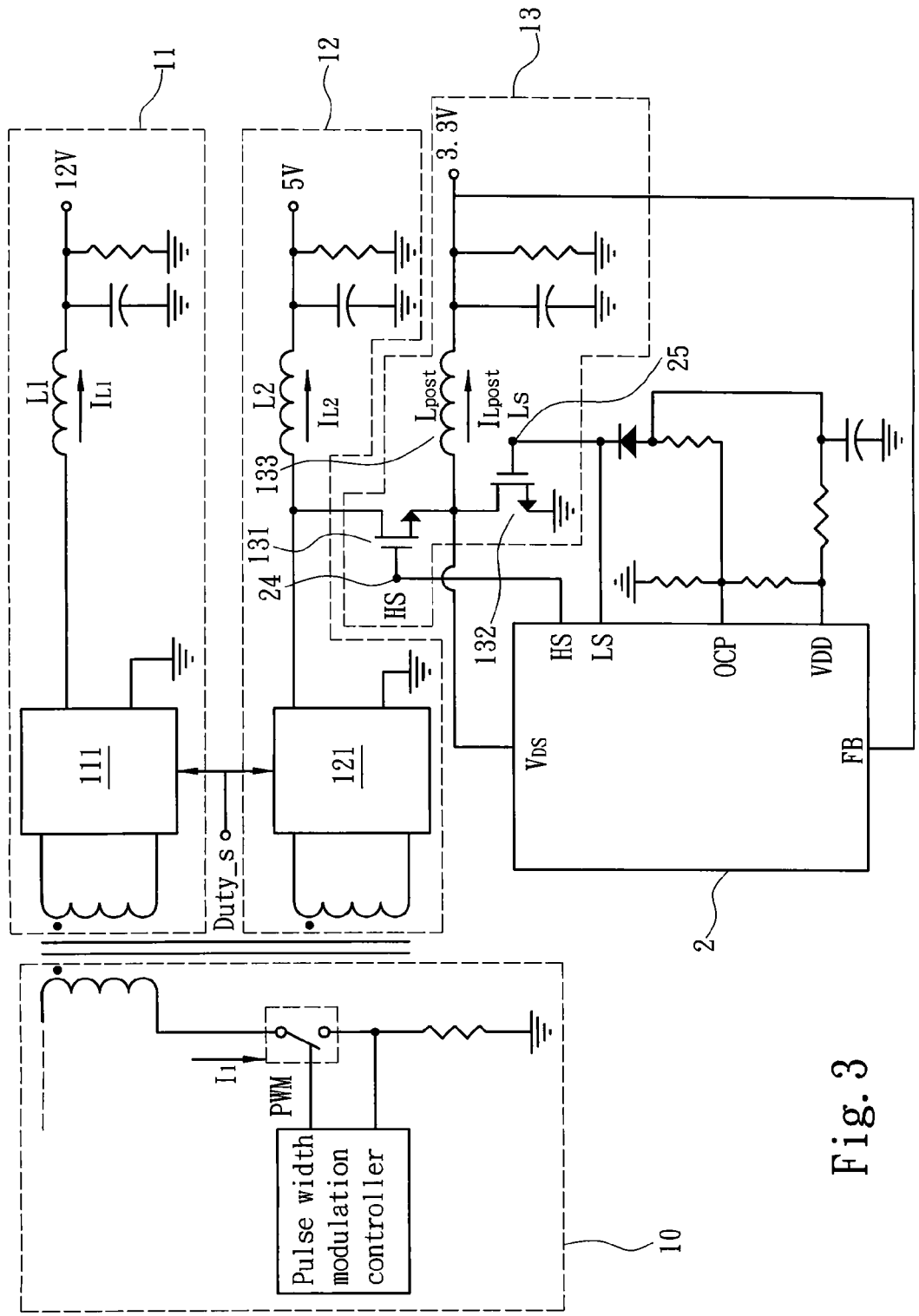
FIG. 3 is a schematic circuit diagram of the present invention.

The present invention aims to provide a post regulation control circuit adopted for a power supply equipped with a post regulation circuit. Please refer to FIG. 3, the power supply has a transformer including a primary side 10 to send power to two primary output circuits 11 and 12 of a secondary side of the transformer. The two primary output circuits 11 and 12 regulate through switch units 111 and 121 to become primary output power of 12V and 5V. A post regulation circuit 13 is connected to one of the primary output circuit 12 to obtain the primary output power of 5V. The post regulation circuit 13 includes one set of switch unit containing two switches 131 and 132 to regulate the primary output power to become an ancillary output power of 3.3V. The post regulation circuit 13, besides the switches 131 and 132, also includes an inductor 133, a capacitor and a resistor. FIG. 3 illustrates a schematic view and does not aim to fully present the detailed circuitry of the post regulation circuit 13. The elements of the inductor 133, capacitor and the like and their functions are known in the art, thus details are omitted herein.

Figure 4:
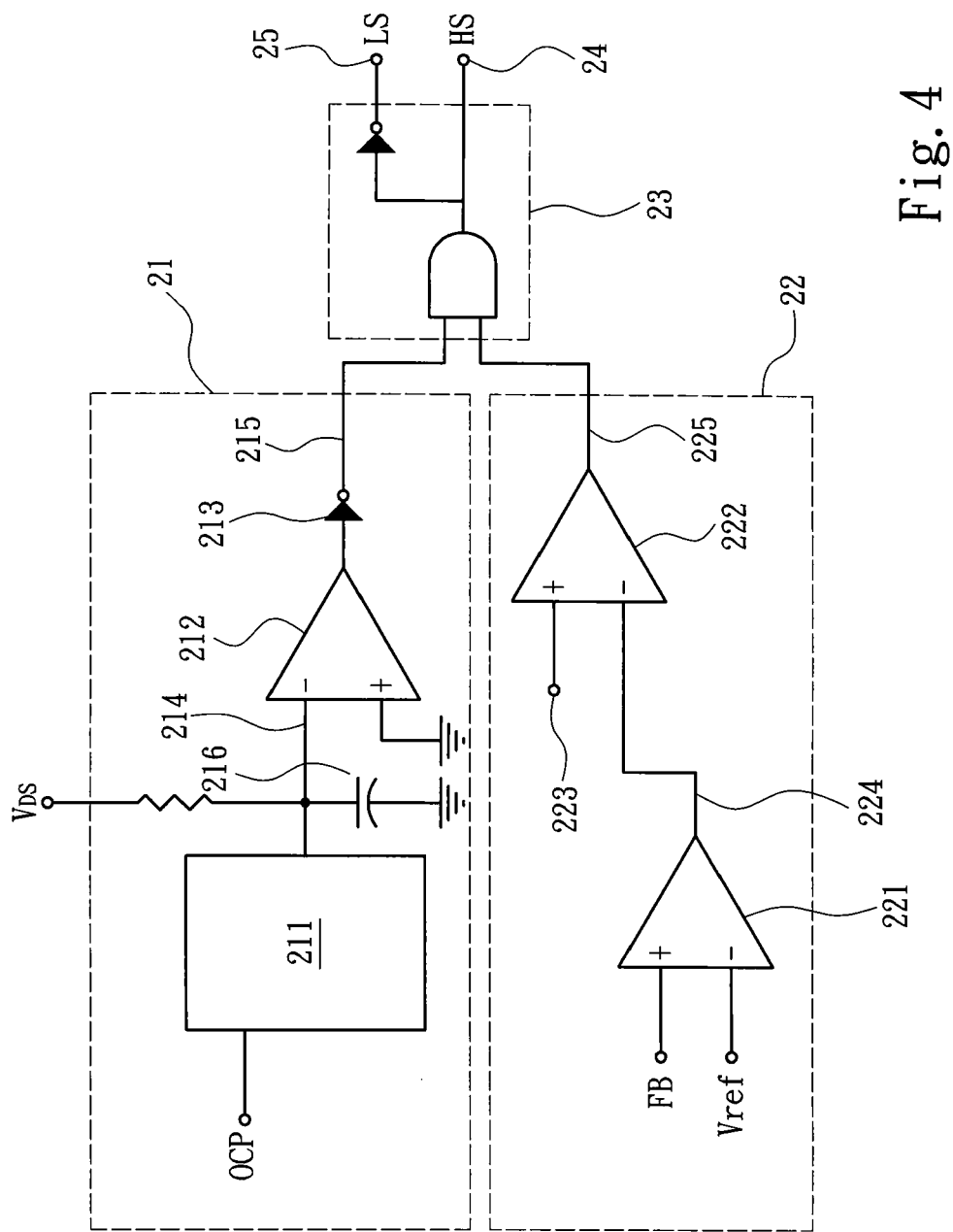
FIG. 4 is a circuit diagram of the monitor circuit of the present invention.

Also referring to FIGS. 3 and 4, the post regulation circuit 13 is controlled by a monitor circuit 2. The monitor circuit 2 obtains a feedback signal (FB) from the ancillary output power and a detection power 214 from the switch unit. The monitor circuit 2, through the feedback signal, regulates the duty cycle of a driving pulse wave 24, and through the detection power 214 determines whether to shrink the front edge of the driving pulse wave 24 to provide protection. The monitor circuit 2 comprises a power monitor unit 21, a pulse wave generation unit 22 and a logic unit 23. The pulse wave generation unit 22 obtains a sawtooth wave signal 223 and a pulse width level signal 224 through a pulse width control comparator 222, and compares these two to output a first pulse wave 225 containing a high and a low level. To provide feedback control function, the pulse wave generation unit 22 further may include a feedback correction amplifier 221 in addition to the pulse width control comparator 222. The feedback correction amplifier 221 obtains a reference voltage (Vref) and the feedback signal (FB) from the ancillary output power. Based on the voltage difference between the reference voltage and the feedback signal, the level of the pulse width level signal 224 is determined. Hence the pulse width level signal 224 is changed by the feedback signal. Moreover, alterations of the pulse width level signal 224 and the sawtooth wave signal 223 change the first pulse wave 225. The power monitor unit 21 sets an abnormal level to judge whether power between the ancillary output circuit 13 and the primary output circuit 12 is abnormal, then determines the time series of executing the protection mechanism.

The power monitor unit 21 mainly comprises a DC source 211 and a comparator 212. The comparator 212 has an input end to obtain a potential to be the abnormal level. In an embodiment shown in FIG. 4, the comparator 212 has an input end grounded with voltage 0V as the abnormal level. The DC source 211 and the comparator 212 have a line between them to connect to the post regulation circuit 13 to form the detection power 214. As shown in FIGS. 3 and 4, the line between the DC source 211 and the comparator 212 is linked between the two switches 131 and 132 to capture the primary output power passing through the switch unit to serve as the detection power 214. Alteration amount of the detection power 214 is proportional to that of the ancillary output power. Thus the power monitor unit 21 can monitor the power flowing into the ancillary output circuit 13 to quickly detect and avert generation of reverse current. The DC source 211 is driven by an over current signal (OCP) to provide a buffer power, and forms a steady DC level in a capacitor 216, thereby increases the DC level of the detection power 214. As a result, the difference between the detection power 214 and the abnormal level is increased to avoid erroneous actions. The comparator 212 compares the abnormal level and the detection power 214. Moreover, through an inverter 213, a status signal 215 is output. The low and high levels of the status signal 215 indicate whether the detection power 214 is over the abnormal level. The logic unit 23 obtains the first pulse wave 225 and the status signal 215. Referring to FIG. 4, the logic unit 23 includes an AND gate to receive the first pulse wave 225 and the status signal 215, and according to the status signal 215 to determine whether to output a driving pulse wave 24 (HS) based on the waveform of the first pulse wave 225. More specifically, the driving pulse wave 24 is output only when the status signal 215 and the first pulse wave 225 are at the high level. In the event that the power monitor unit 21 detects abnormal conditions occurred to the detection power 214, output of the status signal 215 is stopped so that the logic unit 23 stops the driving pulse wave 24 to restrict duty time series of the switch unit. When the switch unit as shown in FIG. 3 includes two switches 131 and 132, the logic unit 23 may include a branch line to generate an inverse driving pulse wave 25 (LS) so that the switches 131 and 132 can be driven by the driving pulse wave 24 and inverse driving pulse wave 25 to be conducted alternately.

Figure 5:
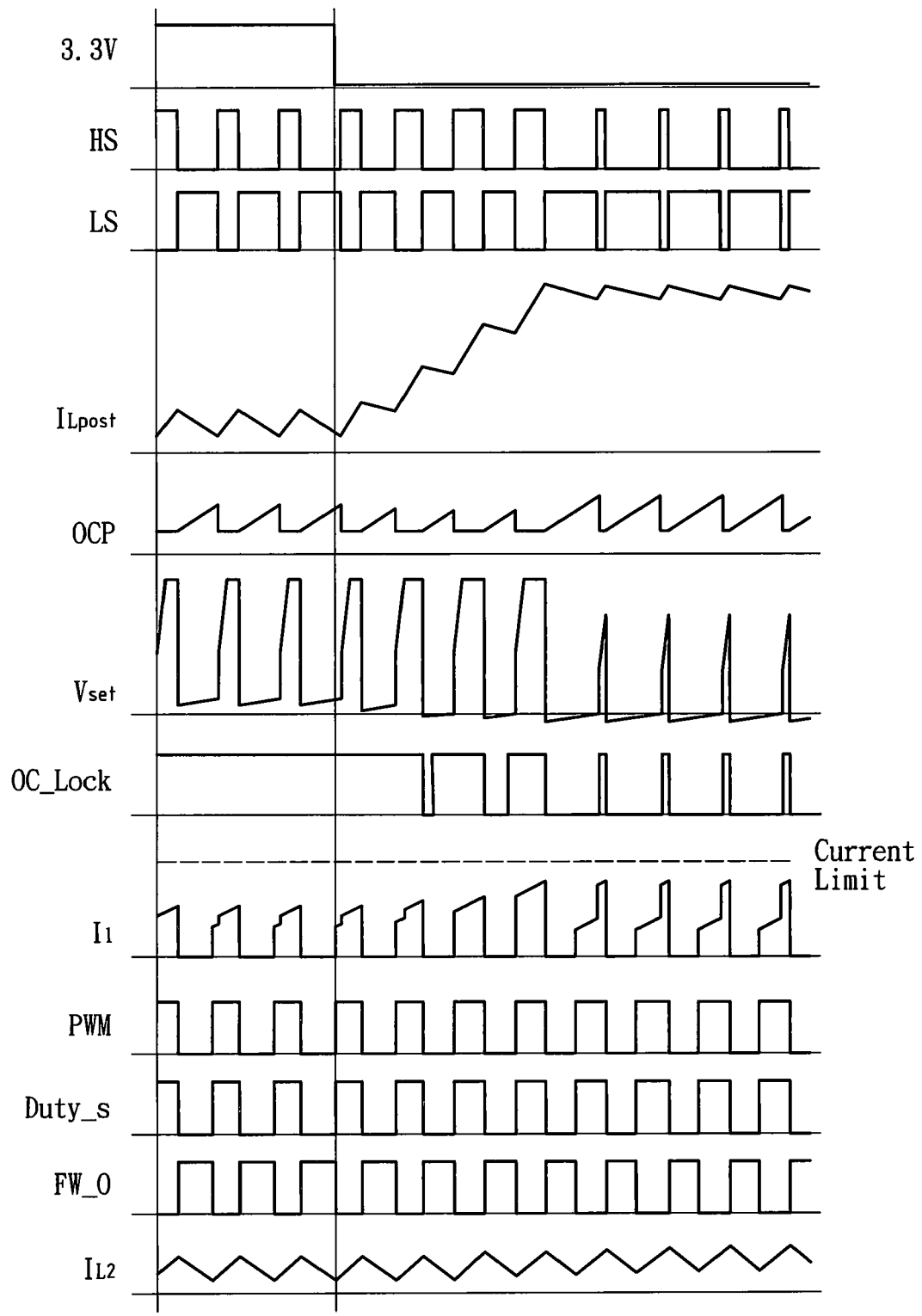
FIG. 5 is a waveform chart on various nodes of the circuit according to the present invention.

Referring to the circuit diagrams shown in FIGS. 3 and 4, and node waveform chart shown in FIG. 5, when the ancillary output power of 3.3V is normal, the waveform of the status signal 215 (OC_Lock) is at a high level in normal condition so that the first pulse wave 225 is not shrunk by the logic unit 23 to form the driving pulse wave 24 and inverse driving pulse wave 25. In the normal condition, power ($V_{DS}$) passing through the switches 131 and 132 enters the power monitor unit 21; adding the DC level provided by the DC source 211 and through the capacitor 216, the waveform of the detection power 214 (Vset) is formed as shown in FIG. 5. As shown in FIG. 5, the detection power 214 is positive (above the abnormal level) in the normal condition. As the detection power 214 is obtained between the switches 131 and 132, it fluctuates with the ON period of the switches 131 and 132.

When the ancillary output power (3.3V) is short circuit, the induction current ($I_{Lpost}$) rises rapidly in each charge period. But due to the feedback signal has a lower voltage, the pulse wave generation unit 22 increases the duty cycle of the first pulse wave 225, hence malfunction cannot be eliminated quickly. When the induction current ($I_{Lpost}$) rises abruptly to a certain current amount, the detection power 214 is lower than the abnormal level (0V), that indicates the post regulation circuit 13 is abnormal. When the detection power 214 is lower than the abnormal level, the comparator 212 changes output state, through the inverter 213 the status signal 215 is changed to a lower level. Hence the logic unit 23 shrinks the front edge of the driving pulse wave 24 until the detection power 214 is above the abnormal level. Referring to FIG. 5, when the induction current ($I_{Lpost}$) rises abruptly, the detection power 214 (Vset) drops or even lower than the abnormal level (with the waveform lower than the original point), the status signal 215 (OC_Lock) changes state to shrink the front edge of the driving pulse wave 24 until the detection power 214 (Vset) returns to the normal condition (with the waveform returning above the original point). Hence before the short circuit condition is fixed, the induction current ($I_{Lpost}$) does not resume to the normal condition. However, the monitor circuit 2 can control the reverse current by greatly shrinking the front edge of the driving pulse wave 24. Hence even if the post regulation circuit 13 cannot function normally, the connected primary output circuit 12 does not suffer any damage. As a result, an independent protection effect is accomplished. Therefore, the present invention provides a significant improvement over the conventional technique.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

Figure 1:
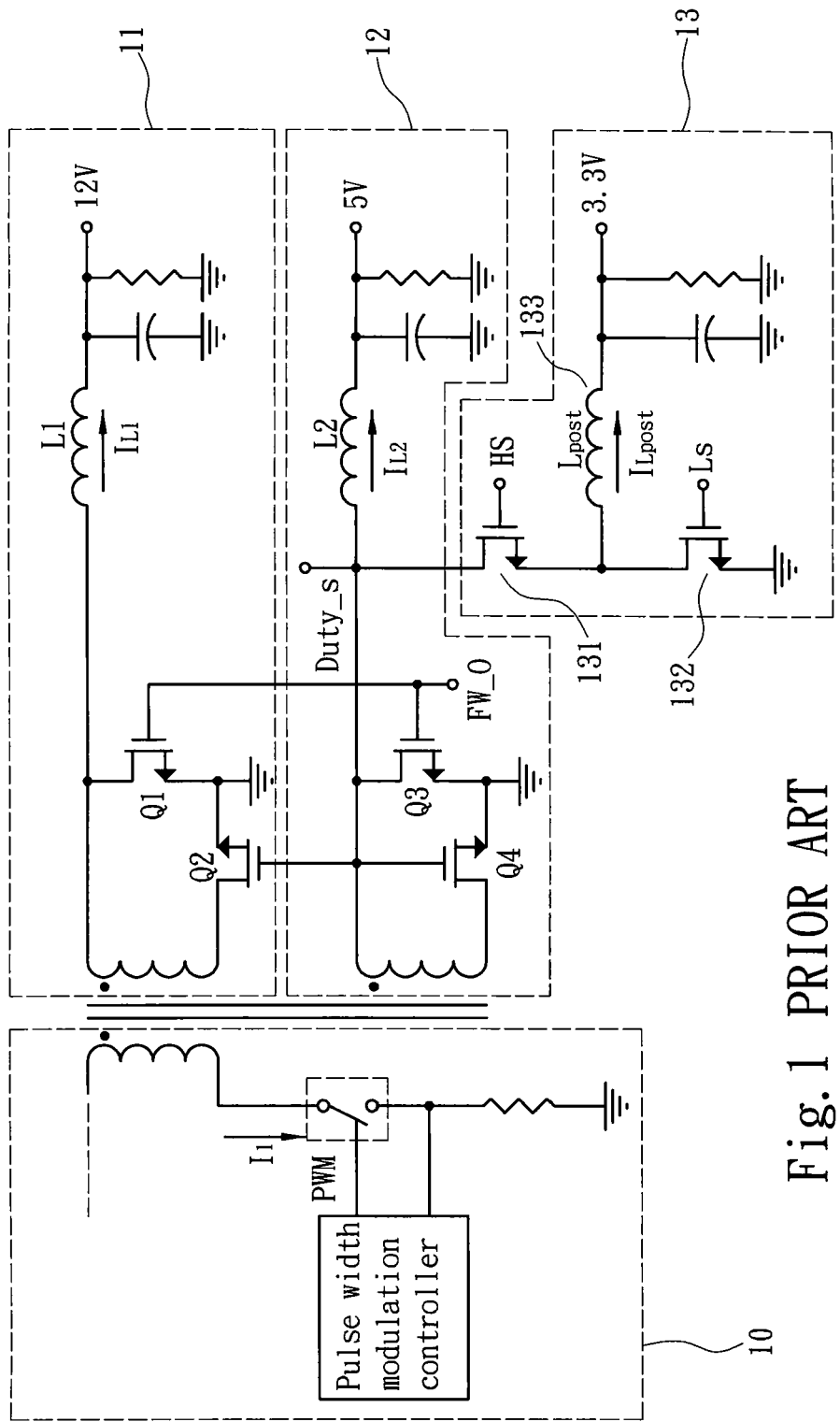
FIG. 1 is a schematic circuit diagram of a conventional power supply equipped with a post regulation circuit.
Figure 2:
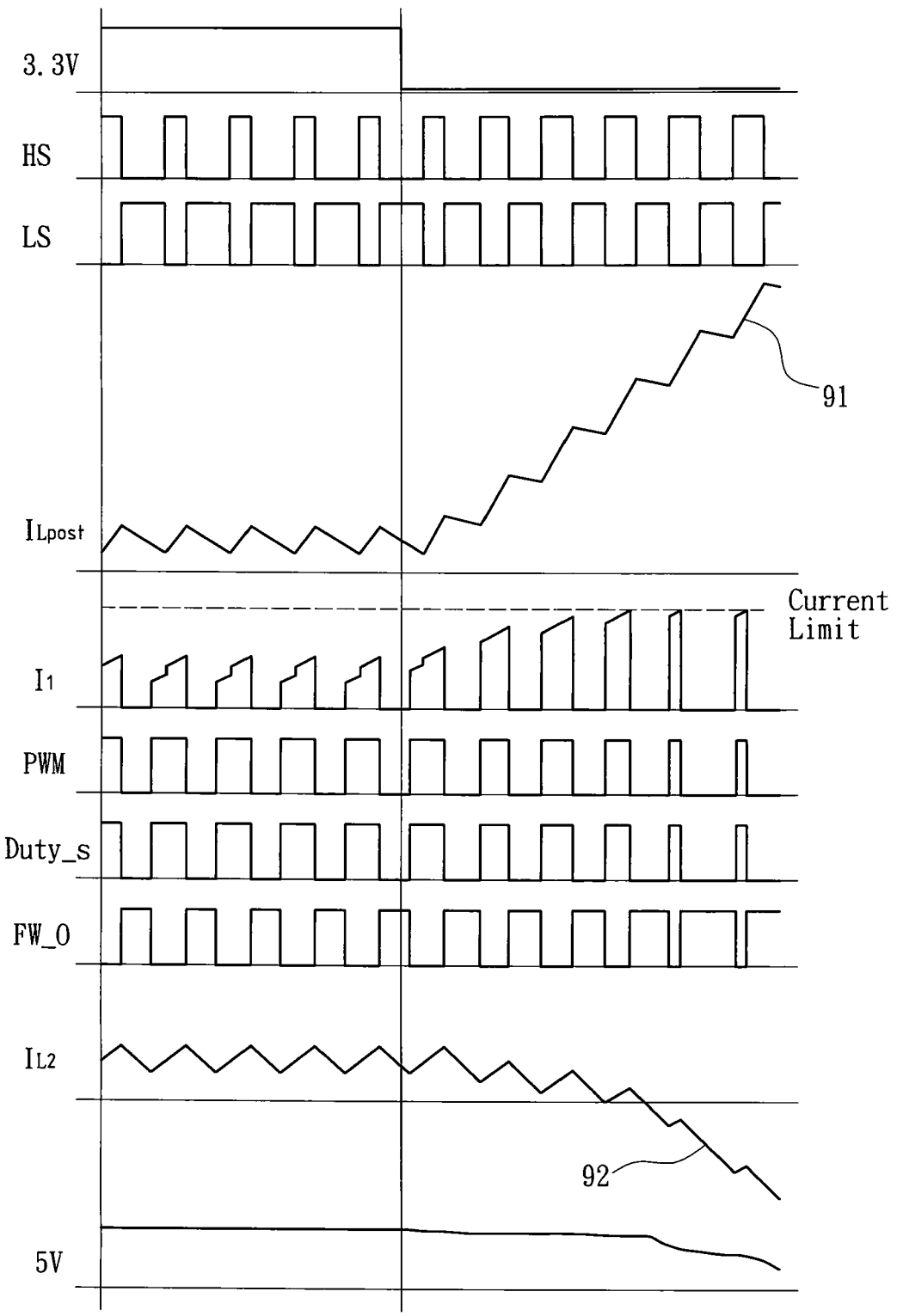
FIG. 2 is a waveform chart on various nodes of the conventional circuit according to FIG. 1.

Legend for FIGS. 1 and 3:
Pulse width modulation controller

What is claimed is:

1. An over current protection circuit for an output circuit, the over current protection circuit being connected to a post regulation circuit, wherein the post regulation circuit is connected to at least one primary output circuit of a secondary side of a transformer to obtain a primary output power regulated by the primary output circuit, the post regulation circuit contains a switch unit to regulate the primary output power to an ancillary output power at a first node of the post regulation circuit, and the over current protection circuit controls duty time series of the switch unit, wherein the over current protection circuit obtains a feedback signal from the ancillary output power to regulate a duty cycle of a driving pulse wave, obtains a detection power at a second node of the post regulation circuit from the switch unit to determine whether to shrink a front edge of the driving pulse wave, where the first node is distinct from the second node, and comprises:
 a pulse wave generation unit to output a first pulse wave;
 a power monitor unit which sets an abnormal level and obtains the detection power from the post regulation circuit to compare with the abnormal level, and outputs a status signal to indicate whether the detection power is over the abnormal level; and
 a logic unit which obtains the first pulse wave and the status signal and determines based on the status signal whether to output the driving pulse wave according to the waveform of the first pulse wave or stop outputting the driving pulse wave to restrict the duty time series of the switch unit.

2. The over current protection circuit of claim 1, wherein the logic unit includes at least one logic gate arranged to perform predetermined logic calculation upon the first pulse wave and the status signal to determine the driving pulse wave.

3. The over current protection circuit of claim 1, wherein the detection power has an alteration in proportional to an alteration of the ancillary output power.

4. The over current protection circuit of claim 3, wherein the detection power is captured from the primary output power passing through the switch unit.

5. The over current protection circuit of claim 1, wherein the power monitor unit outputs a buffer power to increase DC level of the detection power to enhance the difference between the detection power and the abnormal level to avert erroneous actions.

6. The over current protection circuit of claim 5, wherein the power monitor unit includes a DC source to provide the buffer power and a comparator to obtain the abnormal level, the DC source and the comparator being bridged by a line to connect to the post regulation circuit to obtain the detection power, the comparator comparing the abnormal level with the detection power at the DC level increased by the buffer power and determining output time series of the status signal based on the comparison result.

7. The over current protection circuit of claim 1, wherein the pulse wave generation unit obtains a sawtooth wave signal and a pulse width level signal through a pulse width control comparator that are compared to output the first pulse wave containing a high level and a low level.

8. The over current protection circuit of claim 7, wherein the pulse wave generation unit further includes a feedback correction amplifier to output the pulse width level signal, the feedback correction amplifier receiving a reference voltage and a feedback signal from the ancillary output power, the level of the pulse width level signal being determined by the voltage difference of the reference voltage and the feedback signal.

* * * * *